US008556557B2

(12) United States Patent
Britton et al.

(10) Patent No.: US 8,556,557 B2
(45) Date of Patent: Oct. 15, 2013

(54) HYDRAULIC NUT AND IMPROVED SEALS THEREFOR

(76) Inventors: Gordon Britton, Grand Bend (CA); David Hughes, Grand Bend (CA); Mark Johnson, Dallas, TX (US)

(*) Notice: Subject to any disclaimer, the term of this patent is extended or adjusted under 35 U.S.C. 154(b) by 390 days.

(21) Appl. No.: 11/404,179

(22) Filed: Apr. 14, 2006

(65) Prior Publication Data

US 2006/0257227 A1    Nov. 16, 2006

Related U.S. Application Data

(63) Continuation-in-part of application No. 10/886,959, filed on Jul. 8, 2004, now abandoned.

(51) Int. Cl.
*F16B 31/00* (2006.01)
*F16J 15/16* (2006.01)

(52) U.S. Cl.
USPC ............... 411/14.5; 411/434; 277/647

(58) Field of Classification Search
USPC ............ 411/434, 14.5, 917; 277/644, 647
See application file for complete search history.

(56) References Cited

U.S. PATENT DOCUMENTS

| | | | | | |
|---|---|---|---|---|---|
| 2,878,085 | A | * | 3/1959 | Barnhart | 277/438 |
| 3,058,750 | A | * | 10/1962 | Taylor | 277/312 |
| 3,761,053 | A | * | 9/1973 | Bedo et al. | 251/88 |
| 3,820,799 | A | * | 6/1974 | Abbes | 277/647 |
| 4,218,067 | A | * | 8/1980 | Halling | 277/605 |
| 4,592,558 | A | * | 6/1986 | Hopkins | 277/572 |
| 4,706,970 | A | * | 11/1987 | Ramirez | 277/556 |
| 4,739,997 | A | * | 4/1988 | Smetana | 384/131 |
| 5,046,906 | A | * | 9/1991 | Bucknell | 411/432 |
| 5,354,072 | A | * | 10/1994 | Nicholson | 277/647 |
| 5,730,569 | A | * | 3/1998 | Bucknell | 277/646 |
| 5,799,953 | A | * | 9/1998 | Henderson | 277/554 |
| 5,813,674 | A | * | 9/1998 | Dickie et al. | 277/395 |
| 6,494,465 | B1 | * | 12/2002 | Bucknell | 277/641 |
| 6,612,584 | B1 | * | 9/2003 | Ferouz et al. | 277/609 |
| 6,983,940 | B2 | * | 1/2006 | Halling | 277/604 |
| 7,111,821 | B2 | * | 9/2006 | Promper | 251/214 |
| 7,373,951 | B2 | * | 5/2008 | Gossett et al. | 137/625.33 |

OTHER PUBLICATIONS http://web.archive.org/web/20030130095525/http://www.technofast.com/products/hydranut/page2.html.*

* cited by examiner

*Primary Examiner* — Flemming Saether
(74) *Attorney, Agent, or Firm* — Fay Sharpe LLP

(57) ABSTRACT

A hydraulic nut for tensioning an assembly comprises a mechanical threaded locking collar to minimize load loss during transfer of hydraulic load to the locking collar, an annular piston, an annular pressure area to generate an axial load under hydraulic pressure, a hydraulic pressure port and preferably metallic seals to maintain the hydraulic pressure within the annular pressure area that operates in an elastic region and continues to actuate hydraulic pressure after repeated operating temperature cycles. The seals of the hydraulic nut have a 'U' or 'C' shaped cross-section.

17 Claims, 10 Drawing Sheets

H2 = H1 - (b1-b2)

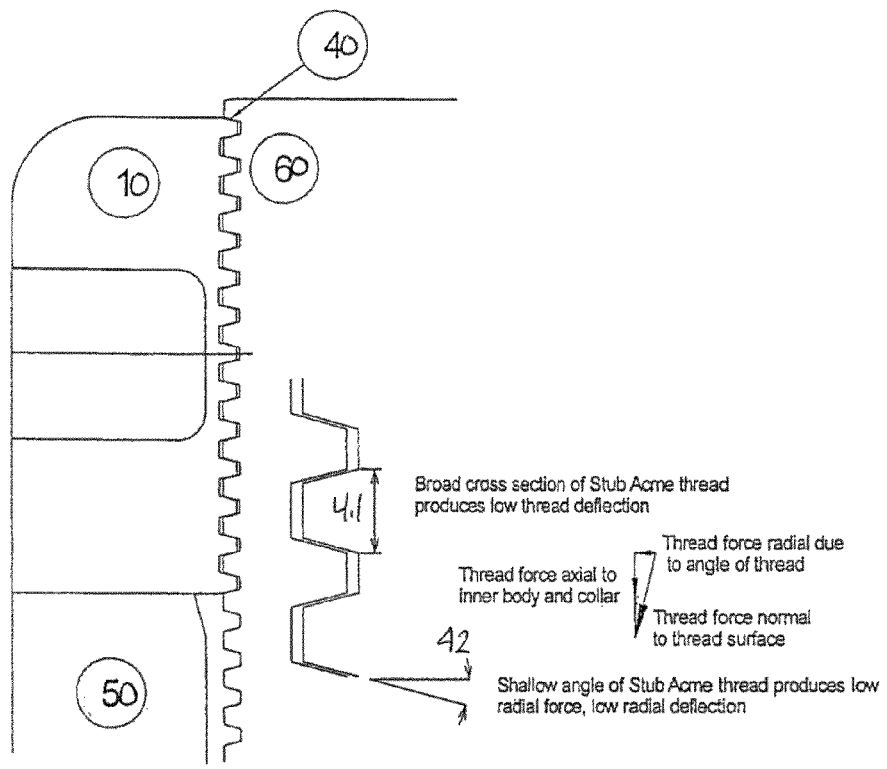

Curved seal surface maintains contact during misalignment

Elastic movement of seal

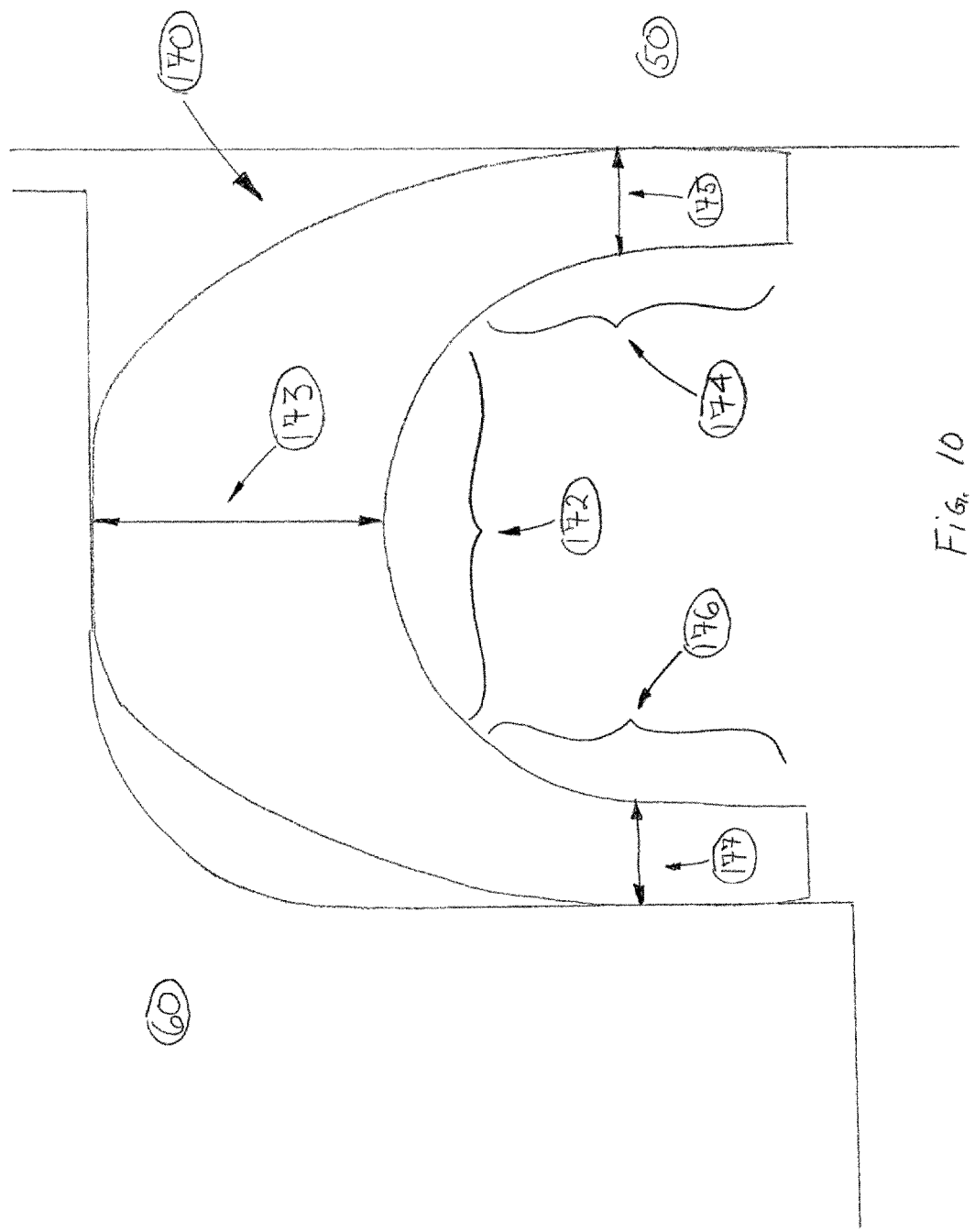

HYDRAULIC NUT AND IMPROVED SEALS THEREFOR

CROSS-REFERENCE TO RELATED APPLICATIONS

The present application is a Continuation-in-Part of commonly assigned U.S. patent application Ser. No. 10/886,959, filed Jul. 8, 2004, now abandoned.

FIELD OF THE INVENTION

The present invention generally relates to hydraulic nuts and methods of using same. More specifically, the present invention is concerned with hydraulic nuts which provide a load to a fastener in an assembly.

BACKGROUND OF THE INVENTION

Hydraulic nuts are well known and have been in wide use throughout the industry for many decades.

More recently, hydraulic nuts are made up of an inner body that is threaded on to the stud to be tightened, an outer body that acts as a piston to generate an axial load to clamp the work pieces being joined and a locking collar to mechanically maintain the axial load generated by the hydraulic pressure in the annual piston created between the inner and outer bodies. The gap between the inner and outer bodies needs to be sealed so that hydraulic pressure is generated. This is achieved by a built-in or added sealing device.

Assembly of thousands of bolted flanged connections occurs annually throughout the resource processing industries of oil and gas, power generation and other manufacturing industries. General assembly technologies primarily include hand or hammer tightening and some torque tightening. Problems remain with these general tightening processes that result in failure of the clamped connection, delays and work place injuries.

Hydraulic nuts have been seen to address these concerns. However, present forms of hydraulic nuts limits their use on a variety of applications.

Some of the limitations of present hydraulic nut technology concern the space envelope required to fit the nut, reliable assembly and disassembly of the nut after repeated operating cycles at high temperature, inability to sustain high pressures, the speed needed to install the nuts and the loss of load from the locking collar.

The aim of this invention is to broaden the use of hydraulic nut technology so that a wider number of applications can realize its benefits. There is therefore a need for a hydraulic nut which can obviate the above-mentioned limitations.

OBJECTS OF THE INVENTION

Accordingly, a first object of the invention is to provide a hydraulic nut which can sustain higher pressures.

Another object of the present invention is to provide hydraulic nut with improved seals which generally prevent leaks at high pressure.

Another object of the present invention is to provide hydraulic nut which generally prevent loss of load.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

More specifically, in accordance with the present invention, there is provided a hydraulic nut for tensioning an assembly comprising an inner body mountable to a stud, bolt, shank, etc.

As used hereinafter, the term "stud" shall also encompass similar mechanical elements such as bolt, shank, dowel, rod, screw, etc. which can be used in conjunction with a hydraulic nut to secure an assembly.

The hydraulic nut further comprises an outer body matingly connected to the inner body and which defines, with the inner body, an annular pressure area therebetween. The hydraulic nut also comprises a locking collar mounted to the inner body and located adjacent to the outer body, sealing means located between the inner body and the outer body and adjacent to the annular pressure area defined between the inner body and the outer body, and a hydraulic pressure port extending through the hydraulic nut to the pressure area.

In the hydraulic nut of the present invention, the sealing means are annular generally thin-walled high pressure resistant seals which generally define a 'C' or 'U' shaped cross-section (hereinafter only referred to as C-shaped seals). It is to be noted that the term "C-shaped" is used to provide a general idea of the shape of the seals and therefore must not be construed as limitative in any way.

In order to resist to high pressure, the seals of the hydraulic nut of the present invention are preferably made of metal or metal alloys. However, other resilient and highly resistant material could also be used instead.

The objective of the C-shaped seals is to provide a seal with a wall comprising three generally curved outer surfaces which are most preferably always in close contact with the inner body and the outer body regardless of the pressure and/or the movements of the inner body and outer body with respect to each other and/or the size of the radial gap between the inner and outer bodies.

Therefore, when the C-shaped seal of the present invention is viewed from a cross-sectional point of view, the C-shaped seal generally comprise a top central wall portion and two side wall portions extending from each side of the central wall portion. The central and the two side wall portions are preferably curved. As it will be understood, the interior of the seal is empty.

One of the advantages of the C-shaped seal is that it is possible to resiliently push the two side wall portions toward each other in order to compress the seal and install the seal with a slight interference fit. Then, if the radial gap between the inner and the outer bodies increase, the two side wall portions will resiliently at least partially revert back toward their stable position, effectively maintaining the contact between the seal and the inner and outer bodies.

In order to prevent the plastic deformation of the C-shaped seal under extreme pressure, the thickness of the wall of the C-shaped seal can vary between each portion. In one embodiment of the present invention, the thickness of the C-shaped seal wall is generally uniform and even along the two side wall portions and the central wall portion.

In another embodiment, the thickness of central wall portion is larger than the thickness of the side wall portions.

Another main advantage of these C-shaped seals is that then can generally sustain higher pressures than prior art seals without incurring leaks. By sustaining higher pressures, the hydraulic nut of the present invention can be used where larger nuts were previously required. Moreover, the hydraulic nut of the present invention can be used where high pressures are required but where space envelop is an issue.

According to another aspect of the present invention, the inner body of the hydraulic nut further comprises a first annular groove adjacent to the pressure area to secure a first sealing means. This first groove also preferably comprises a radially protruding retaining lip to prevent the first sealing means from leaving the groove. However, other seal retention devices are contemplated and are within the scope of this invention.

According to another aspect of the present invention, the outer body of the hydraulic nut also comprises a second annular groove adjacent to the pressure area to secure a second sealing means. This second groove can also preferably comprise a radially protruding retaining lip to prevent the second sealing means from leaving the groove. Still, other seal retention devices are contemplated and are within the scope of this invention.

According to yet another important aspect of the present invention, the locking collar is most preferably threadedly mounted to the inner body via stub acme threads. The stub acme threads generally prevent or at least reduce load loss when the hydraulic pressure is removed and the axial load is transferred to the locking collar. By having shallower angle, the stub acme threads have a lesser tendency to radially deflect when loaded as in a hydraulic nut. Radial deflection of the locking collar generally induces load loss in the hydraulic nut. In order to compensate for those load losses and to retain a certain residual load, prior art nuts were generally either enlarged or overpressurized. However, by having stub acme threads, the nuts of the present invention have much less load losses. Therefore, a smaller nut of the present invention can be used wherein larger prior art nuts were previously required. Thus, the use of stub acme threads in the locking collar/inner body interface allows to reduce the space envelop of the hydraulic nut.

According to still another aspect of the present invention, the pressure area defined between the inner and outer bodies has a non-linear cross-section. Preferably, such non-linear cross-section is either 'S' shaped or 'Z' shaped. This non-linear cross-section generally allows to have more compact hydraulic nut since it is possible to generally reduce the thickness of the hydraulic nut.

Even though the main aspect of the present invention is the use of C-shaped seals in a hydraulic nut, it has been found that the combination of C-shaped seals, stub acme threads and S-shaped pressure area provides a hydraulic nut which is more compact yet which sustains higher pressures than prior art hydraulic nuts. The hydraulic nut of the present invention can therefore be used in locations and/or applications where hydraulic nuts were not used before.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

The above and other objects and advantages and novel features of the present invention will become apparent from the following detailed description of a preferred embodiment illustrated in the accompanying drawings wherein:

FIG. 3 is a partial detail view showing the threads of the hydraulic nut assembly of FIG. 1;

FIG. 10 is a partial detail view showing a second embodiment of the seals of the hydraulic nut assembly of FIG. 1;

DETAILED DESCRIPTION OF THE PREFERRED EMBODIMENT

Generally stated, the present invention relates to hydraulic nuts which may be used to provide a load to a fastener in an assembly.

Figure 1:
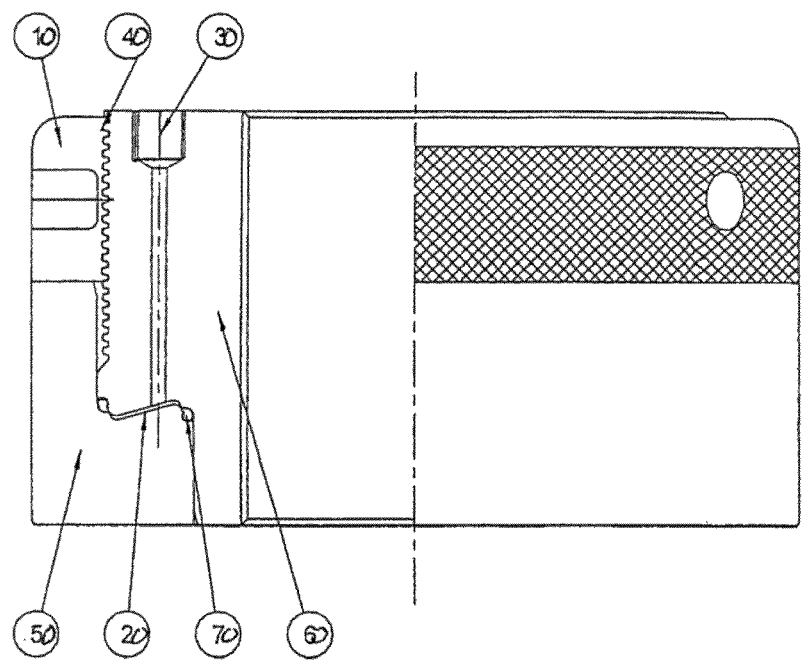
FIG. 1 is a side elevation view showing a hydraulic nut assembly according to an embodiment of the present invention.

As shown in FIG. 1, a hydraulic nut generally comprises an inner body (60) that is threaded onto the stud (not shown) to be tightened, an outer body (50) that acts as a piston to generate an axial load to clamp the work pieces being joined and a locking collar (10) to mechanically maintain the axial load generated by the hydraulic pressure in the annual piston created between the inner and outer bodies. The gap between the inner and outer bodies generally needs to be sealed so that hydraulic pressure is generated. This is achieved by a built-in or added sealing device 70.

The present invention concerns the following aspects of a hydraulic nut assembly:

High Performance Metallic Seal

Figure 5:
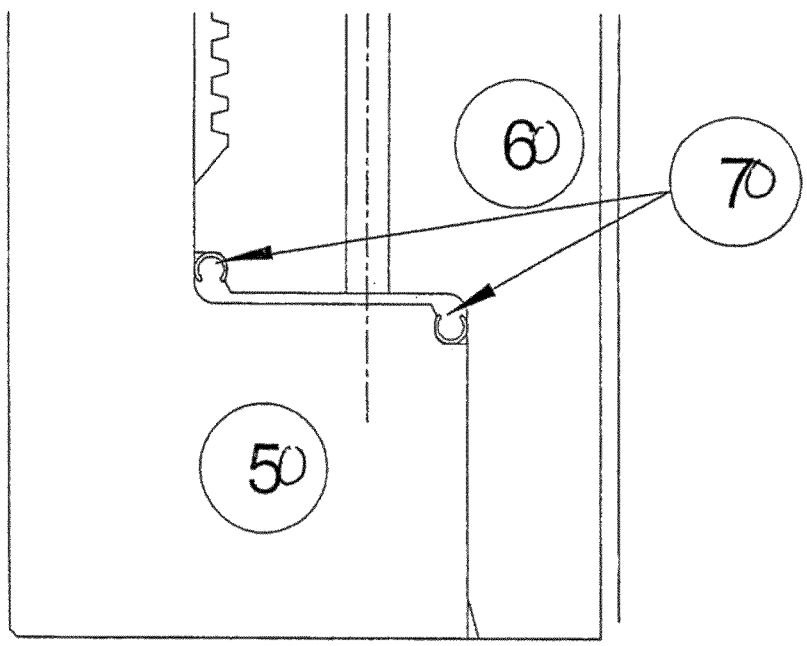
FIG. 5 is a partial detail view showing an embodiment of the seals of the hydraulic nut assembly of FIG. 1.

As seen in FIG. 1, the hydraulic nut is generally pressured through a hydraulic port (30). The pressure is applied across the surfaces of the annular piston (20) generating an applied load in proportion to the hydraulic pressure and the hydraulic area. As shown in FIG. 5, the pressure is held between seals (70) that seal off the radial gap between the nut inner (60) and outer bodies (50).

Traditional hydraulic nut seals are typically made from elastomeric material. Elastomers have limits on operating temperatures and pressures that make them ineffective in high temperature applications or restricted work space applications that need a more compact nut that operates at higher pressures. Newer metallic seals have been developed to overcome some of the limitations.

Figure 4A:
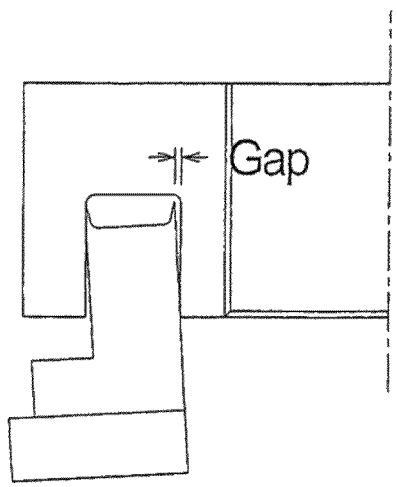
FIG. 4a is a partial detail view showing the seal of a hydraulic nut assembly from the prior art.
Figure 4B:
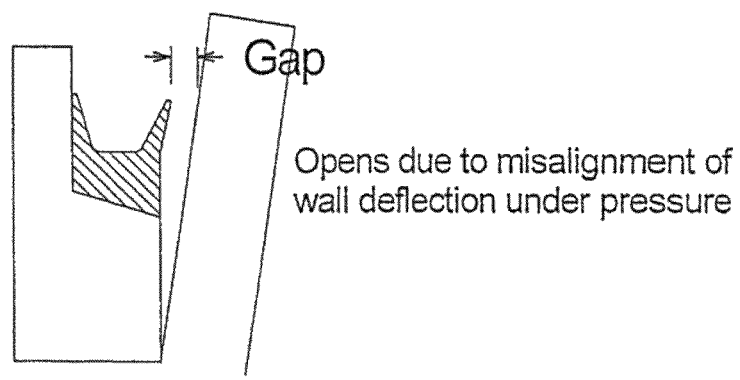
FIG. 4b is a partial detail view showing the seal of a hydraulic nut assembly from the prior art.

Common metallic seals in use now are uni-body feather-edged seals (FIG. 4a). These seals are a machined lip that is part of the body of the hydraulic nut (FIG. 4b), or machined as a separate component (FIG. 4b). A thin lip comes in contact with the cylinder wall under pressure to maintain a seal. While this seal can be effective at high hydraulic pressures, it often leaks at low pressures when it does not have the advantage of the force of the hydraulic pressure to contact the cylinder. Moreover, integral and machined edge seals have low elastic resistance. In service, misalignment of the components of the nuts is a common occurrence due to misalignment of the stud and the flange it is connected to. This misalignment causes the sealing to pull away from the cylinder wall, resulting in leakage. Under pressure, the cylinder wall deflects (FIGS. 4a and 4b) outward in a radial direction. The seal must move outward with the wall to maintain contact and seal. The limitations of the existing metallic seals to maintain hydraulic pressure at low pressure during service misalignment and cylinder wall deflection limits their use.

Figure 6:
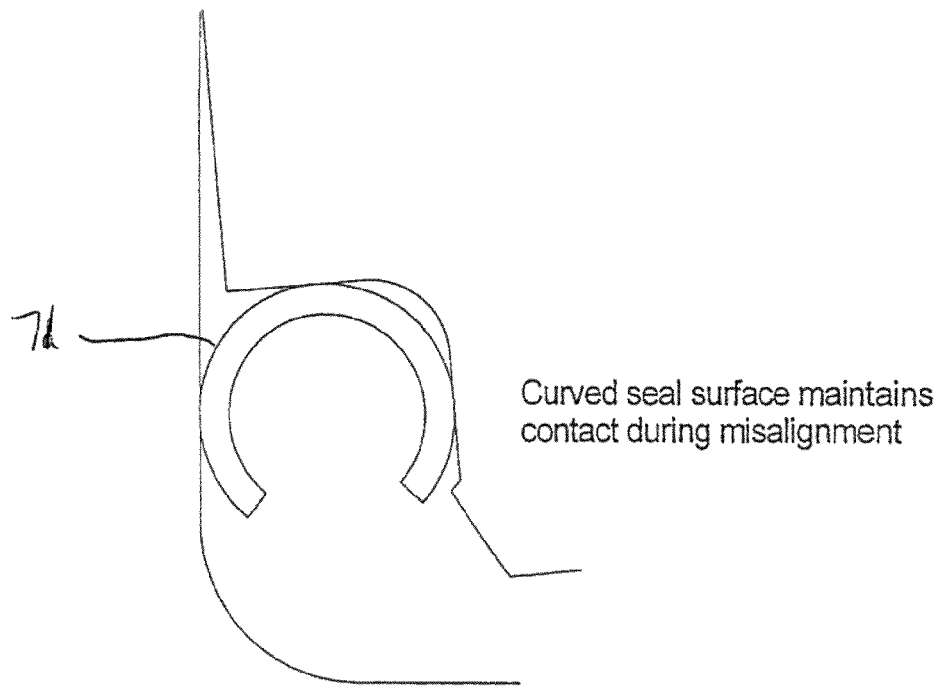
FIG. 6 is a partial detail view showing a misalignment of the seal of FIG. 5.

The hydraulic nut assembly of the present invention circumvents the limitations of the prior art featheredged seals by providing a novel high-pressure seal 70. The hydraulic nut assembly of the present invention thus includes thin-walled curved C-shaped seals as shown in FIGS. 5 and 6. The thin walled C-shaped seal has excellent elastic and resilient capabilities and can accommodate far greater radial movement than the edged seals. The C-shaped seal may be installed with a slight interference fit. Its flexibility and resiliency generally allows easy installation, with reduced friction during movement. The interference fit will generally maximize contact with the cylinder walls at lower pressures as well as extreme high pressures.

Figure 7:
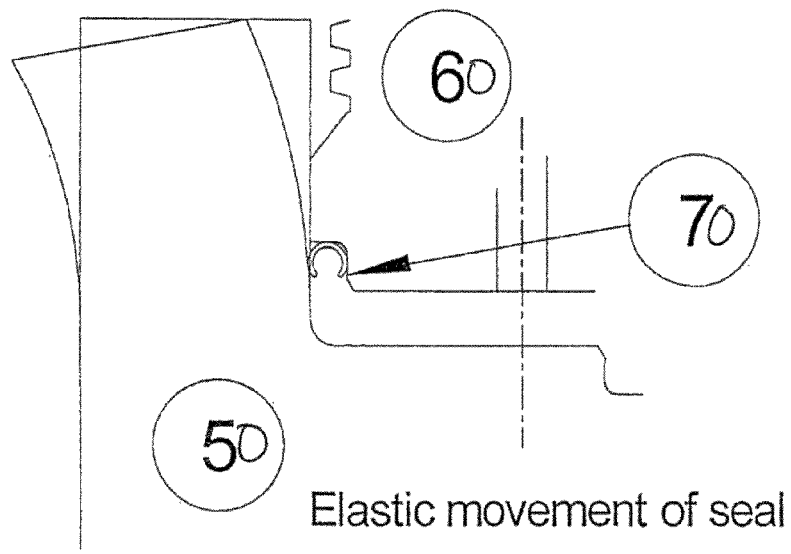
FIG. 7 is a partial detail view showing the elastic movement of the seal of FIG. 5.

The seal contact is made on the curved outer surface of the C-shaped seal (FIG. 6). The curved seal outer surface (71) maintains contact even during misalignment. The curved C-shaped shaped seal acts as an open thin walled cylinder. Pressure acting on the side of the seal deflects the seal in a radial direction. The supported thin wall section allows for enhanced elastic range for the seal to move with radial expansion of the cylinder ((50), FIG. 7).

Figure 9:
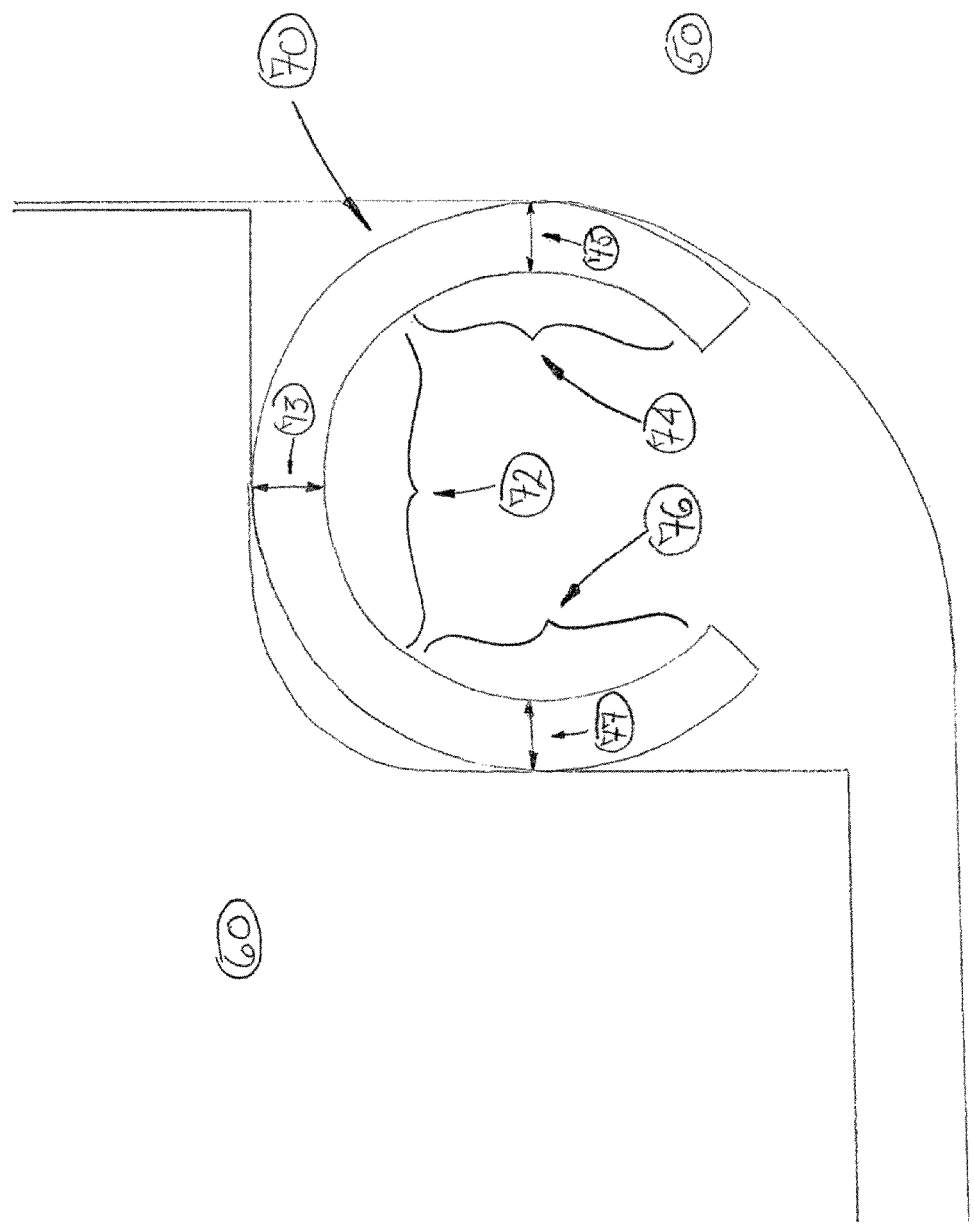
FIG. 9 is a partial detail view showing a first embodiment of the seals of the hydraulic nut assembly of FIG. 1.

The C-shaped seals of the hydraulic nut of the present invention can generally be decomposed into three wall portions. As shown in FIG. 9, the C-shaped seal (70) comprises a generally central top wall portion (72), a first side wall portion (74) extending from the top wall portion (72) and a second side wall portion (76), opposite to the first side wall portion (74) and also extending from the top wall potion (72). In use, the side wall portions (74) and (76) are in contact with the inner body (60) and the outer body (50) in order to provide an effective seal.

In the embodiment of FIG. 9, the thickness (73), (75) and (77) of the wall portions (72), (74) and (76) respectively are substantially even and uniform.

However, in some application, it might be necessary to provide even more resistant C-shaped seals in order to sustain extremely high pressures. Referring to FIG. 10, we can see a variant of the C-shaped seal (170) adapted to sustain extreme pressure. As for the seal (70), the seal (170) comprises a top wall portion (172), a first side wall portion (174) and a second side wall portion (176).

When the seals (70) are subjected to extremely high pressure, it is usually the top wall portion which is strained the most. In fact, beyond a certain point, the top wall portion (72) can be plastically deformed. This plastic deformation can negatively alter the performance of the seals (70).

In order to prevent such plastic deformation, the thickness (173) of the top wall portion (172) of the C-shaped seal (170) is substantially larger than the thickness (175) and (177) of the first and second side wall portions (174) and (176) respectively.

Understandably, the thickness shown in FIGS. 9 and 10 are for example purposes only and the exact thickness of the top wall portion and the side wall portions should be chosen to provide a seal which will sustain the pressure of a particular application.

Low Load Loss Locking Collar

While under pressure, an axial load is generated in the hydraulic nut tensioning the stud or fastener in an equal axial direction while compressing the components in the work piece.

In many hydraulic nut applications, a mechanical locking collar is utilized to retain the load generated by the hydraulic pressure. This is achieved by turning down the locking collar (10) while under hydraulic pressure, using the mating threads (40) between the locking collar and inner body (60), until the face of the locking collar (10) is in firm contact with the mating face of the outer body (50). The hydraulic pressure is then released. A transfer of load then occurs between the mating threads of the locking collar (10) and inner body (60) and the mating face between the locking collar (10) and outer body (50). The threads of the locking collar (10) and inner body (60) will tend to deflect under the applied load. The angle of the threads cause a radial force exerted by the threads causing a radial deflection of the locking collar (10). The radial deflection of the locking collar (10) allows the collar (10) to slide down the inclined plane of the thread form. The result of the thread deflection and thread sliding is to cause a loss of preload generated by the hydraulic pressure. In order to maintain the required load, higher applied pressures or larger hydraulic nuts are required to achieve the necessary residual load. A load loss is created due to the thread form and transfer of load. This load loss has to be accounted for in the nut design by designing a nut with higher applied load. This increases the annular piston area and resultant increase in nut dimensions.

The hydraulic nut assembly of the present invention can utilize a thread with a broader cross-section such as a stub acme thread which is outlined in FIG. 3.

The stub acme thread (40) has a broad cross section (41) as compared to standard thread forms, the increased moment of inertia and low moment arm of the reaction force generally results in low thread deflection under applied load. The load loss is therefore reduced, reducing the annular piston area and over dimensions of the nut making it more compact and able to fit in to a broader number of applications.

The shallow angle (42) of the threads also reduces the radial force generated when the load is transferred to the locking collar. This also generally reduces the hoop stress in the locking collar.

'S' or 'Z' Shaped Piston

As seen in FIG. 1, pressure is generated in the annular piston area (20) created between the sealing devices (70) of the inner and outer nut bodies (60 and 50).

Figure 2A:
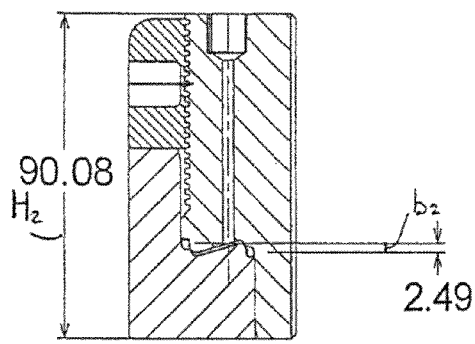
FIG. 2a is a partial section view showing the 'S' or 'Z' shaped piston of the hydraulic nut assembly of FIG. 1.
Figure 2B:
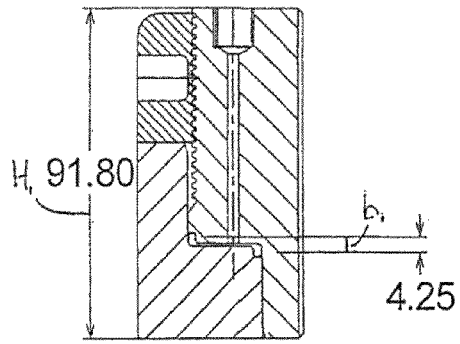
FIG. 2b is a partial section view showing a hydraulic nut assembly from the prior art.

By staggering the seal arrangement as shown in FIG. 2a when compared to a prior art hydraulic nut illustrated in FIG. 2b, the overall height of the nut can be reduced according to the following equation:

$$H_2 = H_1 - (b_1 - b_2)$$

where:

$H_2$ is height of the hydraulic nut assembly in accordance with the invention;

$H_1$ is height of a hydraulic nut of the prior art;

$b_1$ is axial distance between seals of a hydraulic nut of the prior art; and $b_2$ is axial distance between seals of the hydraulic nut assembly in accordance with the invention.

Therefore, by providing a hydraulic nut which has a reduced thickness, it is possible to further reduce the space envelop of hydraulic nut, increasing its range of applications.

Seal Retaining Lip

A hydraulic nut generally operates with the inner and outer body moving in an axial direction under pressure. The seal needs to be fixed to one component while it slides along the cylinder wall of the outer component. If the seal moves out of its groove on the fixed component, hydraulic fluid will leak around it.

Figure 8:
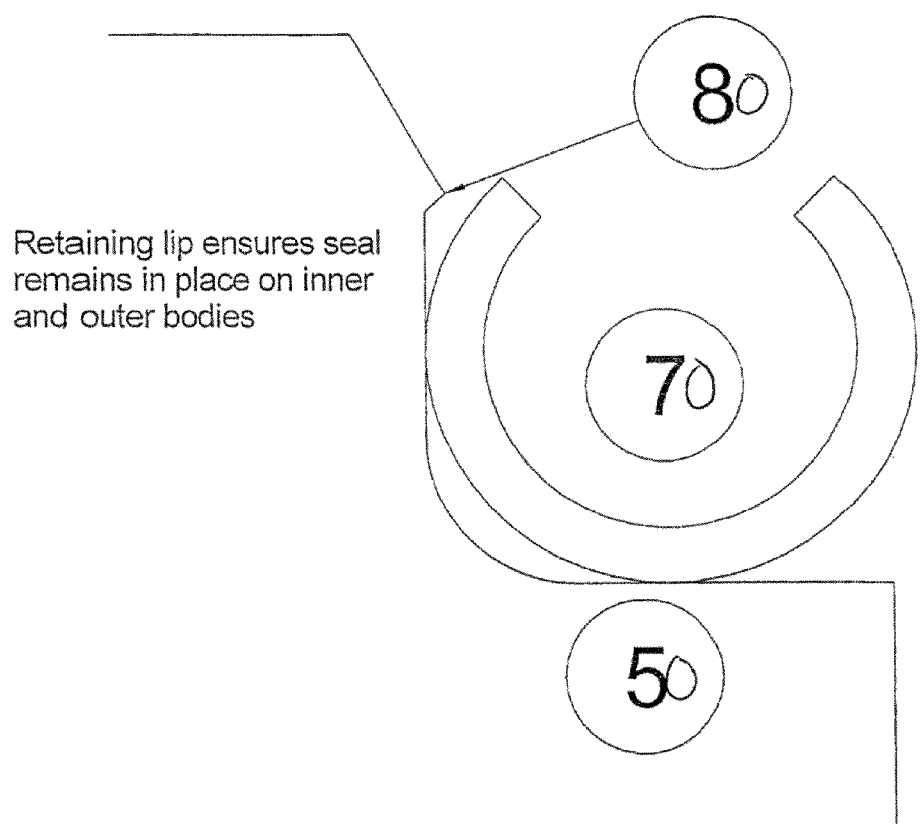
FIG. 8 is a partial detail view showing the retaining lip of the hydraulic nut assembly of FIG. 1.

A retaining lip ((80) in FIG. 8) may be machined into the nut bodies (50) and (60) to help retain the seals (70) in place. The curved C-shaped seal (70) generally has sufficient elastic flexibility to be inserted into the groove of the hydraulic nut and 'snap' into place. The lip (80) then generally prevents the seal from moving in an axial direction under hydraulic operation in the fixed component while it maintains a sliding contact on the cylinder wall of the moving component. The retaining lip (80) may be machined into both the inner and outer bodies (50) and (60) to retain these seals (70) respectively.

Although the present invention has been described hereinabove by way of preferred embodiments thereof, it can be modified, without departing from the spirit and nature of the subject invention as defined in the appended claims.

The invention claimed is:

1. An annular generally C-shaped seal for use in cooperation with a hydraulic nut comprising an outer body and an inner body slidingly received into said outer body and defining therewith an annular pressure area, said hydraulic nut having at least one annular groove defined between said inner and outer bodies and located adjacent to said pressure area, said at least one groove being configured to receive said seal, said seal being made of a resilient and metallic material and having a cross-section comprising:
   a. a central wall portion having a substantially curved outer surface;
   b. a first lateral wall portion extending from said central wall portion and having a substantially curved outer surface;
   c. a second lateral wall portion extending from said central wall portion and opposite said first lateral wall portion, said second lateral portion having a substantially curved outer surface;
      wherein the central wall portion, the first lateral wall portion and the second lateral wall portion define an internal space in fluid communication with the opening and opening in a direction substantially parallel to a center axis of the seal;
      wherein when said seal is inserted into said at least one groove, said substantially curved outer surface of said central wall portion is substantially in contact against a substantially planar surface of one of said inner and outer bodies, said substantially curved outer surface of said first lateral wall portion is resiliently biased into direct tangential contact against one of said inner and outer bodies such as to define a first sealing contact point located intermediate said central wall portion and an extremity of said first lateral wall portion, and said substantially curved outer surface of said second lateral wall portion is resiliently biased into direct tangential contact against the other one of said inner and outer bodies such as to define a second sealing contact point intermediate said central wall portion and an extremity of said second lateral wall portion, said first and second sealing contact points being substantially radially aligned; and
      wherein the opening communicates with the annular pressure area so that, in response to pressure in the internal space acting on the first and second lateral wall portions, the first and second lateral wall portions are resiliently urged outwardly to maintain constant tangential contact with the inner and outer bodies to accommodate variations in a radial gap between said inner and outer bodies caused by a radial deflection of said outer body.

2. An annular seal as claimed in claim 1, wherein said central wall portion has a central thickness, said first lateral wall portion has a first thickness, and said second lateral wall portion has a second thickness.

3. An annular seal as claimed in claim 2, wherein said central, first and second thicknesses are substantially equal.

4. An annular seal as claimed in claim 2, wherein said central thickness is larger than said first and said second thicknesses.

5. An annular seal as claimed in claim 1, wherein said cross-section of said seal is substantially C-shaped.

6. An annular seal in combination with a hydraulic nut comprising an outer body and an inner body slidingly received into said outer body and defining therewith an annular pressure area, said hydraulic nut having at least one annular groove defined between said inner and outer bodies and located adjacent to said pressure area, said at least one groove being configured to receive said seal, said seal being made of a resilient, metallic material and having a cross-section comprising:
   a. a central wall portion having a substantially curved outer surface;
   b. a first lateral wall portion extending from said central wall portion and having a substantially curved outer surface; and
   c. a second lateral wall portion extending from said central wall portion and opposite said first lateral wall portion, said second lateral wall portion having a substantially curved outer surface;
      wherein the central wall portion, the first lateral wall portion and the second lateral wall portion define an internal space opening in a direction substantially parallel to a center axis of the seal;
      wherein when said seal is inserted into said at least one groove toward a substantially planar shoulder that is substantially perpendicular to said inner and outer bodies, said central wall portion substantially abuts on said planar shoulder, said substantially curved outer surface of said first lateral wall portion is resiliently biased into direct tangential contact against one of said inner and outer bodies such as to define a first sealing contact point located intermediate said central wall portion and an extremity of said first lateral wall portion, and said substantially curved outer surface of said second lateral wall portion is resiliently biased into direct tangential contact against the other one of said inner and outer bodies such as to define a second sealing contact point located intermediate said central wall portion and an extremity of said second lateral wall portion, said first and second sealing contact points being substantially radially aligned; and
      wherein the opening to the internal space communicates with the annular pressure areas so that, in response to pressure in the internal space acting on the first and second lateral wall portions, the first and second lateral wall portions are resiliently urged radially to maintain constant tangential contact with said inner and outer bodies to accommodate variations in a radial gap between said inner and outer bodies caused by a radial deflection of said outer body.

7. A combination as claimed in claim 6, wherein said central wall portion has a central thickness, said first lateral wall portion has a first thickness, and said second lateral wall portion has a second thickness.

8. A combination as claimed in claim 7, wherein said central, first and second thicknesses are substantially equal.

9. A combination as claimed in claim 7, wherein said central thickness is larger than said first and said second thicknesses.

10. A combination as claimed in claim 6, wherein said cross-section of said seal is substantially C-shaped.

11. A combination as claimed in claim 6, wherein said inner body comprises a radially protruding retaining lip extending adjacent to said at least one groove to prevent said seal from leaving said at least one groove.

12. A combination as claimed in claim 6, wherein said outer body comprises a radially protruding retaining lip extending adjacent to said at least one groove to prevent said seal from leaving said at least one groove.

13. An annular seal for use in cooperation with a hydraulic nut comprising an outer body and an inner body slidingly received into said outer body and defining therewith an annular pressure area, said hydraulic nut having at least one annular groove defined between said inner and outer bodies and located adjacent to said pressure area, said at least one groove being configured to receive said seal and defining a substantially planar shoulder that is substantially perpendicular to said inner and outer bodies, said seal being made of a resilient, metallic material and having a cross-section comprising:
   a. a central wall portion having a substantially curved outer surface;
   b. a first lateral wall portion extending from said central wall portion and having a substantially curved outer surface; and
   c. a second lateral wall portion extending from said central wall portion and opposite said first lateral wall portion, said second lateral wall portion having a substantially curved outer surface;

wherein the central wall portion, the first lateral wall portion and the second lateral wall portion define an internal space opening in a direction substantially parallel to a center axis of the seal;

wherein when said seal is inserted into said at least one groove, said substantially curved outer surface of said central wall portion is substantially in contact against said substantially planar shoulder of said at least one groove, said substantially curved outer surface of said first lateral wall portion is resiliently biased into direct tangential contact against one of said inner and outer bodies such as to define a first sealing contact point, and said substantially curved outer surface of said second lateral wall portion is resiliently biased into direct tangential contact against the other one of said inner and outer bodies such as to define a second sealing contact point, said first and second sealing contact points being substantially radially aligned; and wherein the opening to the internal space is disposed closer to the annular pressure area than the central wall portion and communicates with the annular pressure are so that, in response to pressure in the internal space acting on the first and second lateral wall portions, the first and second lateral wall portions are resiliently urged radially outwardly to maintain constant tangential contact with the inner and outer bodies to accommodate variations in a radial gap between said inner and outer bodies caused by radial deflection of said outer body.

14. An annular seal as claimed in claim 13, wherein said central wall portion has a central thickness, said first lateral wall portion has a first thickness, and said second lateral wall portion has a second thickness.

15. An annular seal as claimed in claim 14, wherein said central, first and second thicknesses are substantially equal.

16. An annular seal as claimed in claim 14, wherein said central thickness is larger than said first and said second thicknesses.

17. An annular seal as claimed in claim 13, wherein said cross-section of said seal is substantially C-shaped.

\* \* \* \* \*